Nov. 7, 1950 W. FREAR 2,529,381
WAVE GUIDE INTERCONNECTING DEVICE
Filed Dec. 30, 1944
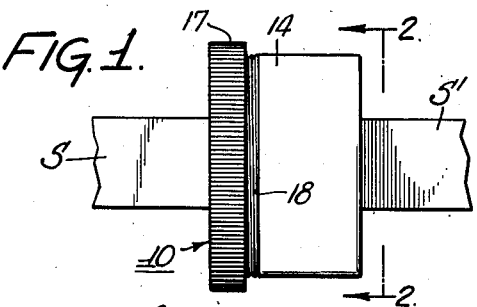
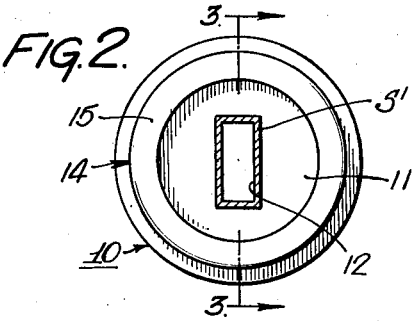
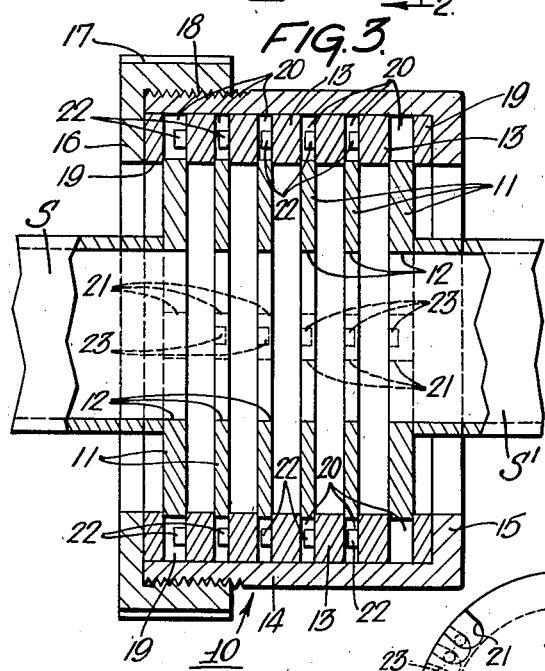
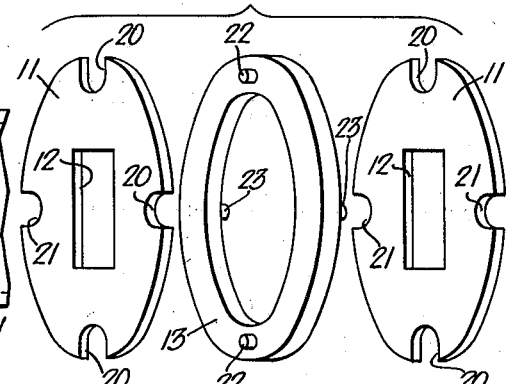
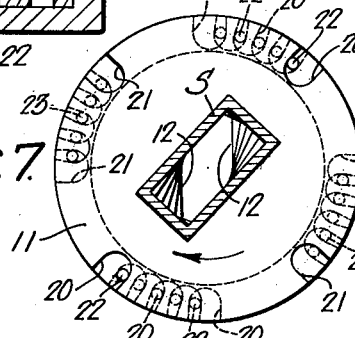
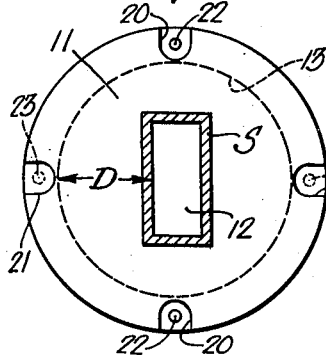
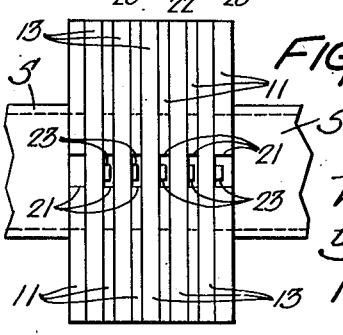
Inventor:
William Frear
by his Attorneys
Howson & Howson Patented Nov. 7, 1950

2,529,381

UNITED STATES PATENT OFFICE 2,529,381

WAVE GUIDE INTERCONNECTING DEVICE

William Frear, Fox Chase, Pa., assignor, by mesne assignments, to Philco Corporation, Philadelphia, Pa., a corporation of Pennsylvania Application December 30, 1944, Serial No. 570,643

7 Claims. (Cl. 178—44)

The present invention relates to wave guides and more particularly to a device for adjustably interconnecting rigid wave guide sections.

In the installation of radio frequency apparatus, particularly ultra high frequency apparatus, employing a rigid substantially rectangular wave guide, it often becomes necessary to impart a definite degree of axial twist to certain sections of the wave guide. Heretofore, the twisting of wave guide sections has been an exacting, skillful and tedious operation, because, unless the twist imparted to the sections is most accurately done, objectionable leakages and other undesirable variations are developed which detrimentally affect the standing wave ratio and consequently hamper the proper functioning of the equipment.

Moreover, in certain types of installations, it frequently occurs that during normal use of an apparatus of the kind above referred to, the wave guide is subjected to torsional stress which may prove detrimental to the proper functioning of the installed equipment by causing breaks in the contour of the wave guide.

It is an object of the present invention to provide a device capable of being readily interposed in the length of a wave guide for providing a self-adjustable connection between sections thereof, so that such sections may be rotated with respect to each other, said device having means automatically actuated by the mere relative rotation of the wave guide sections to produce the effect of a twisted continuous guide thereby eliminating the difficulties usually encountered in the construction of twisted wave guides and facilitating the installation of the latter.

It is also an object of the invention to provide a wave guide interconnecting device which is particularly adapted to take up torsional stresses imposed upon an installed wave guide during normal use of a radio frequency apparatus with which such wave guide is associated, thereby preventing the formation of objectionable breaks in the contour of the wave guide when subjected to such stresses, said device further being adapted for self-adjustment to produce a substantially continuous twisted path which obviates such variations in the standing wave ratio as may arise from wave guide distortions resulting from application of torsional stresses on the wave guide.

Another and more specific object of the invention resides in the provision of a compact, inexpensive and easily manufactured joint for wave guide sections of substantially rectangular cross-sectional configuration, the joint being constructed to provide for adjustable oscillating twisting movements between the joined wave guide sections.

Other objects and advantages of the invention will be apparent from the following description based upon the accompanying drawings in which:

Fig. 1 is a side elevation of a wave guide interconnecting device constructed in accordance with the invention;

Fig. 2 is a sectional elevational view taken in the general direction of arrows 2 in Fig. 1;

Fig. 3 is an enlarged section taken on line 3—3 of Fig. 2;

Fig. 4 is an exploded view in perspective illustrating cooperating parts of the device.

Fig. 5 is an end view of the device with the outer housing removed and showing the inside parts in one position;

Fig. 6 is a side elevation of the parts as shown in Fig. 5;

Fig. 7 is a view similar to Fig. 5 but showing the parts in another position; and Fig. 8 is a side elevation of the parts as shown in Fig. 7.

Referring more particularly to the drawing, the device illustrated therein, and generally indicated by the reference character 10, is intended to join or interconnect two longitudinally aligned sections, S and S', of a wave guide which preferably is of the usual well known construction having a substantially rectangular internal contour, as shown.

The wave guide interconnecting device 10 includes a plurality of metallic disc members 11 each provided with a centrally disposed substantially rectangular opening 12 which corresponds generally to the inner contour of the wave guide sections to be interconnected by said device. The disc members 11 are arranged in equally spaced apart planes determined by means of spacing metallic ring members 13.

The disc and ring members are assembled and maintained in stacked relationship by means of a housing 14 of suitable rigid material, such as metal, said housing defining an internal cylindrical chamber into which the members closely fit but yet are free to be rotated about their common longitudinal axis. Means associated with the housing and engageable with the stack of disc and ring members are provided to prevent said members from spreading apart, such means preferably comprising an annular flange 15 rigid with one end portion of the housing and an annular flange 16 rigid with cap element 17, the latter being adjustably connectable with the other end portion of the housing, for example, by means of screw threads 18.

In practice, the connection between the cap element 17 and the cooperating end portion of the housing is so adjusted that the disc and ring members are clamped between the flanges 15 and 16, sufficiently to maintain their stacked relationship but not enough to interfere with their individual rotational movement nor to cause the rotation of one member through rotational movement of another member, due to their mutual frictional contact. If found desirable or necessary, spacing washers, such as shown at 19, may be interposed between the aforementioned flanges and the end disc members of the stock.

In accordance with the embodiment of the invention as illustrated in the drawing, these end disc members are securely connected, as by brazing or welding, with the respective end portions of the wave guide sections S and S'. As clearly shown in Fig. 4, each disc member 11 is provided with pairs of diametrically opposed recesses 20 and 21 formed at the peripheral edge portion of the disc member, and each ring member 13 carries pairs of diametrically opposed pins 22 and 23. One pair of pins 22 extend laterally from one side surface of the ring member and the other pair of pins 23 extend laterally from the opposite side surface of said ring member, so that one of said pairs of pins, for instance the pins 22, may register with one pair of recesses 20 in the disc member adjacent one surface of the ring member, and the other of said pairs of pins, for instance the pins 23, may register with the other pair of recesses 21 in the disc member adjacent the other surface of the ring member. In this manner, it will be understood that when the disc and ring members are arranged in their alternatively stacked relationship, as more clearly shown in Figs. 5 and 6, they become mutually connected by means of the interengaged pins and recesses, so that rotational movement of one member may be transmitted to the immediately adjoining member.

It is to be noted that the width of the recesses is somewhat larger than the diameter of the pins, thus providing a loose connection between the alternatively stacked disc and ring members, so that the rotational movement above referred to, is transmitted from member to member in a successive and progressive manner, as indicated in Figs. 7 and 8. Because of this sucecssive and progressive rotational movement, the substantially rectangular openings 12 in the series of stacked disc members may, within limits be rotated about the longitudinal axis of the device, each opening being rotatably displaced a few degrees more than the preceding opening, thus producing the effect of a twisted continuous wave guide. As can best be seen in Figures 3, 5 and 7, the opening of each of the spacers or ring members 13 is of a size and shape to leave the opening in members 11 unobstructed at all times. In other words, the opening in each spacer is such that regardless of the adjusted position of members 11, the opening in the latter will not be covered or in any way interfered with by any part of the spacers.

The use of the ring members 13 minimizes frictional engagement of the parts and helps to insure the desired progressive displacement of the disc members, but it results in the formation of tuned cavities. Thus two adjacent disc members and the interposed spacing ring member cooperate to define a tuned cylindrical cavity having a diameter equal to the inside diameter of the ring member, there being a plurality of such cavities in cascade relation. In order to counteract the effect of these cavities, the greatest distance between the edge of the openings 12 and the inside surface of the ring members, indicated at D in Fig. 5 is made approximately equal to one-half of the wave length of the energy to be transmitted through the wave guide sections. Each of the said cavities is thus caused to simulate a half wave line which is short-circuited at one end by the ring 13. Since, as is known in the art, a short circuit at one end of a half wave line produces an effective short circuit at the opposite end of the line, the effect of the above-described arrangement is to make the successive rectangular openings 12 appear to be electrically connected together, thus forming a virtually continuous wave guide.

From the foregoing description, it will be apparent that by using a device constructed in accordance with this invention to interconnect sections of a wave guide, it is possible to readily impart a twist to the wave guide sections whenever desired or necessary.

Moreover, the interposition of such a device in the length of a wave guide to interconnect sections thereof, provides effective means capable of taking up abnormal torsional stresses which may be imposed upon the wave guide in its normal usage. In this manner the wave guide itself is relieved of those stresses which might result in the formation of breaks or other deformations in the contour of said wave guide, which breaks or deformations are liable detrimentally to affect the proper functioning of the equipment.

It will also be appreciated that the self-limitation of the permissible angular displacement, in a given increment of length, makes it possible to produce the effect of a twisted continuous wave guide without the difficulties heretofore experienced.

It is to be understood that the invention is not limited to the specific structural features herein shown and described but is capable of modification within the scope of the appended claims.

I claim:

1. In a wave guide, a device interposed in the length of said guide between sections thereof and operatively connected with said sections to provide for relative rotational movement therebetween, said device including a plurality of rotatably mounted disc members, a plurality of rotatably mounted ring members arranged in alternating relationship with said disc members, each of said disc members having an opening generally corresponding in size and shape to the inner contour of said sections and cooperating therewith to produce a virtually continuous wave guide, and each of said ring members having means engageable with the adjacent disc members for rotating the latter successively and progressively with the relative movement of said sections for locating the openings in said disc members in different angular positions to produce the effect of a twisted guide.

2. In a wave guide, a device interposed in the length of said guide between sections thereof and operatively connected with said sections to provide for relative rotational movement therebetween, said device including a plurality of rotatably mounted disc members, a plurality of rotatably mounted ring members arranged in alternating relationship with said disc members and providing spaces therebetween defining tuned cavities, each of said disc members having an opening generally corresponding in size and shape to the inner contour of said sections and cooperating therewith to produce a virtually continuous wave guide, and each of said ring members having means engageable with the adjacent disc members for rotating the latter successively and progressively with the relative movement of said sections for locating the openings in said disc members in different angular positions to produce the effect of a twisted guide, said cavities being electrically dimensioned so as to effect electrical interconnection between the openings in said disc members.

3. In a wave guide, a device interposed in the length of said guide between sections thereof and operatively connected with said sections to provide for relative rotational movement therebetween, said device including a plurality of rotatably mounted disc members, a plurality of rotatably mounted ring members arranged in alternating relationship with said disc members, each of said disc members having a centrally disposed opening generally corresponding in size and shape to the inner contour of said sections and cooperating therewith to produce a virtually continuous wave guide, said disc members further having annularly disposed recesses, and each of said ring members having pins engageable with the recesses in the adjacent disc members and providing a loose connection therebetween for rotating the latter successively and progressively with relative movement of said sections for locating the openings in said members in different angular positions to produce the effect of a twisted guide.

4. In a device adapted to be introduced in the length of a wave guide for interconnecting sections thereof, a plurality of rotatably mounted members, each of said members having an opening generally corresponding in size and shape to the inside contour of the wave guide, a plurality of rotatably mounted spaces arranged in alternating relationship with said members, each of said spacers having an opening of a size and shape to leave the opening in said members unobstructed at all times, and each of said spacers further having means engageable with the immediately adjacent members to establish a connection therebetween so that upon relative angular displacement of the wave guide sections said members may be rotated to provide the effect of a twisted guide.

5. In a device adapted to be inserted in the length of a wave guide for interconnecting sections thereof, a plurality of rotatably mounted disc members, a plurality of rotatably mounted ring members arranged in alternating relationship with said disc members, each of said disc members having an opening generally corresponding in size and shape to the inside contour of the wave guide, and each of said ring members having means engageable with the adjacent disc members for rotating the latter with relative movement of said sections to produce the effect of a twisted guide.

6. In a device adapted to be inserted in the length of a wave guide, for interconnecting sections thereof, a plurality of rotatably mounted disc members, a plurality of rotatably mounted ring members arranged in alternating relationship with said disc members and providing spaces therebetween defining tuned cavities, each of said disc members having an opening generally corresponding in size and shape to the inside contour of the wave guide, and each of said ring members having means engageable with the adjacent disc members for rotating the latter with relative movement of said sections to produce the effect of a twisted guide, said cavities being electrically dimensioned so as to effect electrical interconnection between the openings in said disc members.

7. In a device adapted to be inserted in the length of a wave guide for interconnecting sections thereof, a plurality of rotatably mounted disc members operatively connectable with the wave guide sections, each of said disc members having a centrally disposed opening generally corresponding in size and shape to the inside contour of the wave guide and further having recesses disposed annularly thereof, a plurality of rotatably mounted ring members arranged in alternating relationship with said disc members and having pins engageable with the recesses in the adjacent disc members for rotating the latter with relative movement of said sections to produce the effect of a twisted guide.

WILLIAM FREAR.

REFERENCES CITED

The following references are of record in the file of this patent:

UNITED STATES PATENTS

| Number | Name | Date |
| --- | --- | --- |
| 2,257,783 | Bowen | Oct. 7, 1941 |
| 2,338,441 | Kohl | Jan. 4, 1944 |
| 2,374,498 | Quayle | Apr. 24, 1945 |
| 2,407,318 | Mieher | Sept. 10, 1946 |